Figure 1:
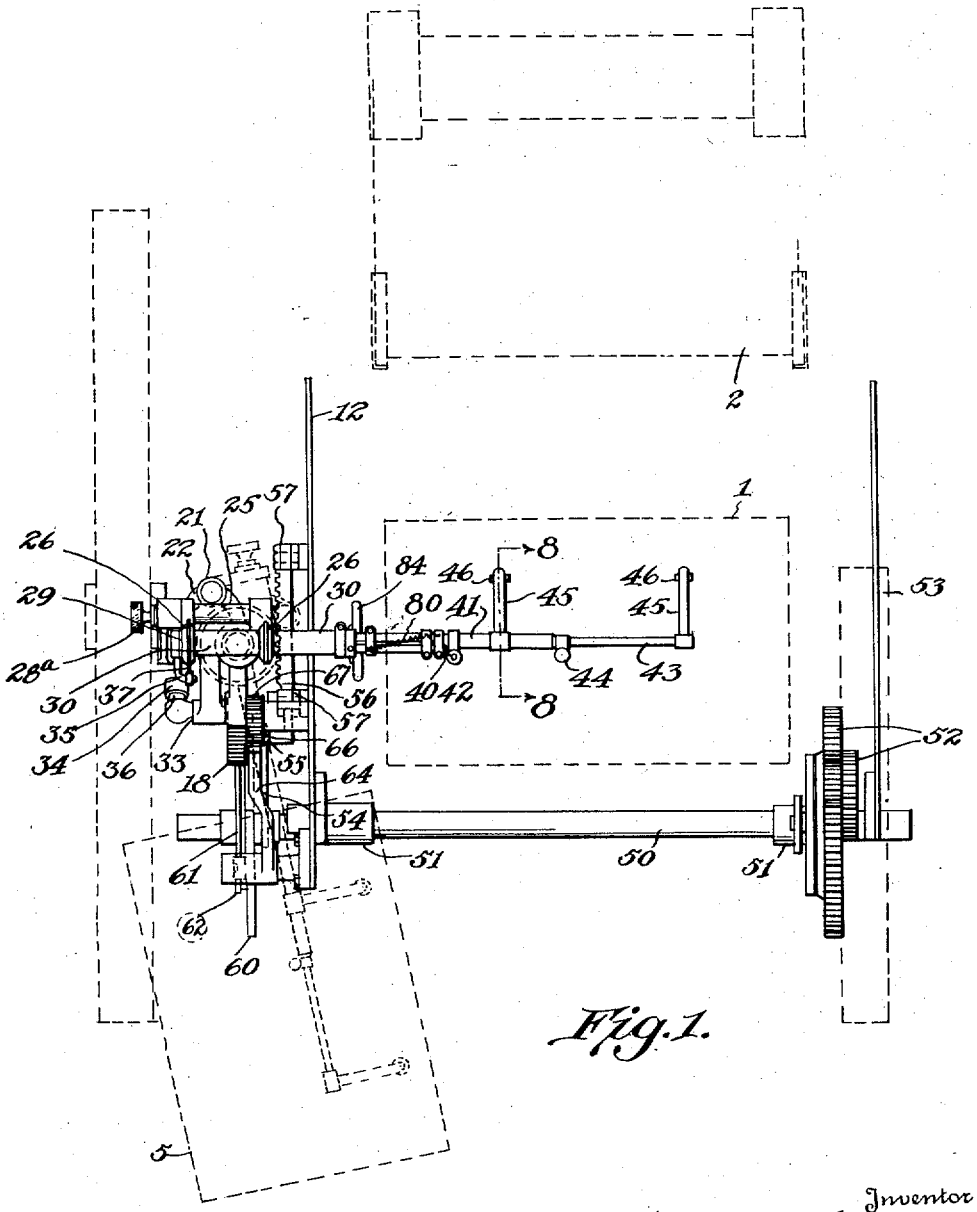

March 15, 1932. C. F. ROOT Re. 18,383

SHEET FEEDING MECHANISM FOR PRINTING PRESSES

Original Filed May 27, 1924 5 Sheets-Sheet 1

Inventor
Charles F. Root

By Fay Oberlin & Fay
Attorneys

March 15, 1932. C. F. ROOT Re. 18,383

SHEET FEEDING MECHANISM FOR PRINTING PRESSES

Original Filed May 27, 1924 5 Sheets-Sheet 2

Inventor

Charles F. Root

By Fay Oberlin & Fay

Attorneys

March 15, 1932. C. F. ROOT Re. 18,383

SHEET FEEDING MECHANISM FOR PRINTING PRESSES

Original Filed May 27, 1924 5 Sheets-Sheet 3

Inventor
Charles F. Root

By Fay Oberlin & Fay
Attorneys

March 15, 1932. C. F. ROOT Re. 18,383

SHEET FEEDING MECHANISM FOR PRINTING PRESSES

Original Filed May 27, 1924 5 Sheets-Sheet 4

Inventor
Charles F. Root

By Fay Oberlin & Fay
Attorneys

March 15, 1932. C. F. ROOT Re. 18,383
SHEET FEEDING MECHANISM FOR PRINTING PRESSES
Original Filed May 27, 1924 5 Sheets-Sheet 5
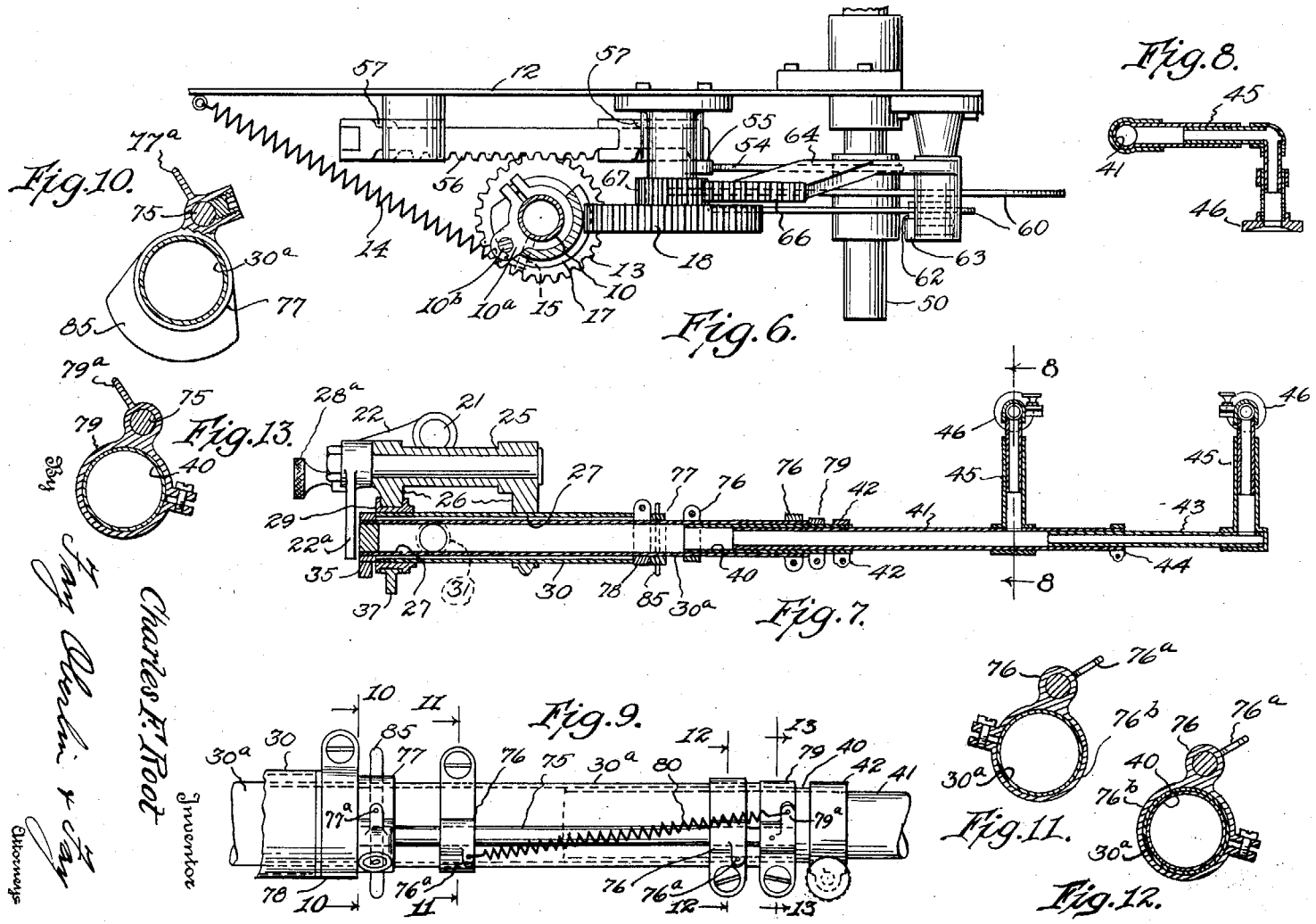
Inventor
Charles F. Root
By Fay Oberlin & Fay
Attorneys Reissued Mar. 15, 1932

Re. 18,383

UNITED STATES PATENT OFFICE

CHARLES F. ROOT, OF CLEVELAND, OHIO, ASSIGNOR TO THE CHANDLER & PRICE COMPANY, OF CLEVELAND, OHIO, A CORPORATION OF OHIO

SHEET FEEDING MECHANISM FOR PRINTING PRESSES

Original No. 1,610,476, dated December 14, 1926, Serial No. 716,181, filed May 27, 1924. Application for reissue filed March 7, 1927. Serial No. 173,505.

The present improvements which may be regarded as relating in general to mechanism for transferring sheets to or from printing presses have been designed with particular regard to mechanism of this sort intended for use with so-called Gordon or platen printing presses. The peculiar difficulties involved in providing a satisfactory automatic sheet feed (as well as sheet delivery) need not be detailed, being well understood. While numerous attempts have been made to provide devices of this sort, only a relatively small amount have found even limited commercial use and all are characterized not only by being complex in construction, but also by preventing free and convenient access to the press.

One object of the present invention, accordingly, is to provide a sheet transfer mechanism that may be readily attached to existing presses with little or no alteration in their structure and that when attached or installed will not unduly encumber the press or be in the way of the operator. A further object is to provide a mechanism that will be extremely simple and compact in construction with relatively few moving parts and these so formed and disposed as not to be likely to get out of order. At the same time provision is made for necessary adjustment of parts whereby the suction fingers or equivalent sheet engaging means may be adjusted so as to locate the sheets accurately on the platen of the press.

The present invention presents an improvement on the invention disclosed in my copending application Serial No. 462,256—sheet feeding mechanism for printing presses.

To the accomplishment of the foregoing and related ends, the invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

In said annexed drawings:—

Figure 2:
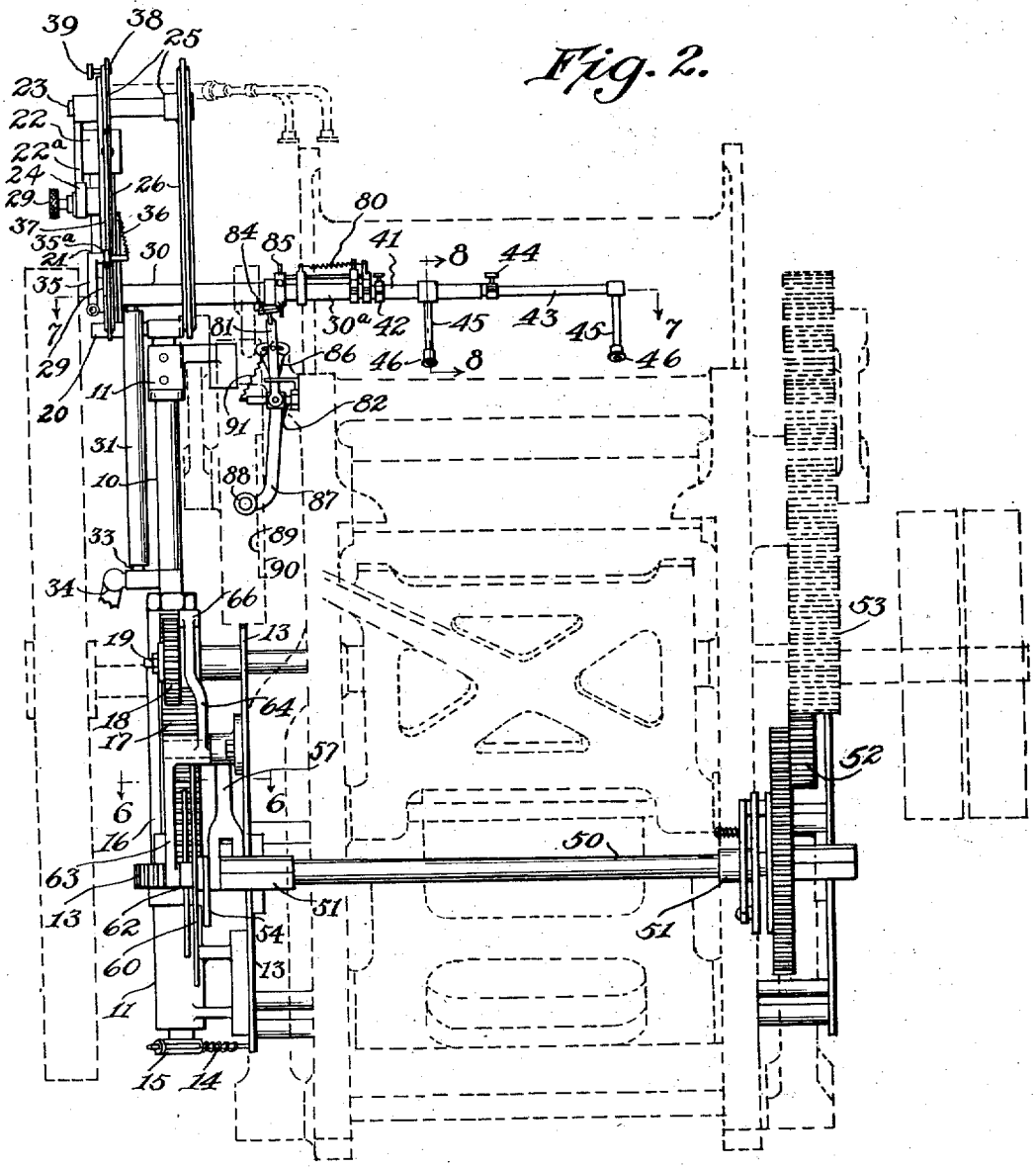
Figure 3:
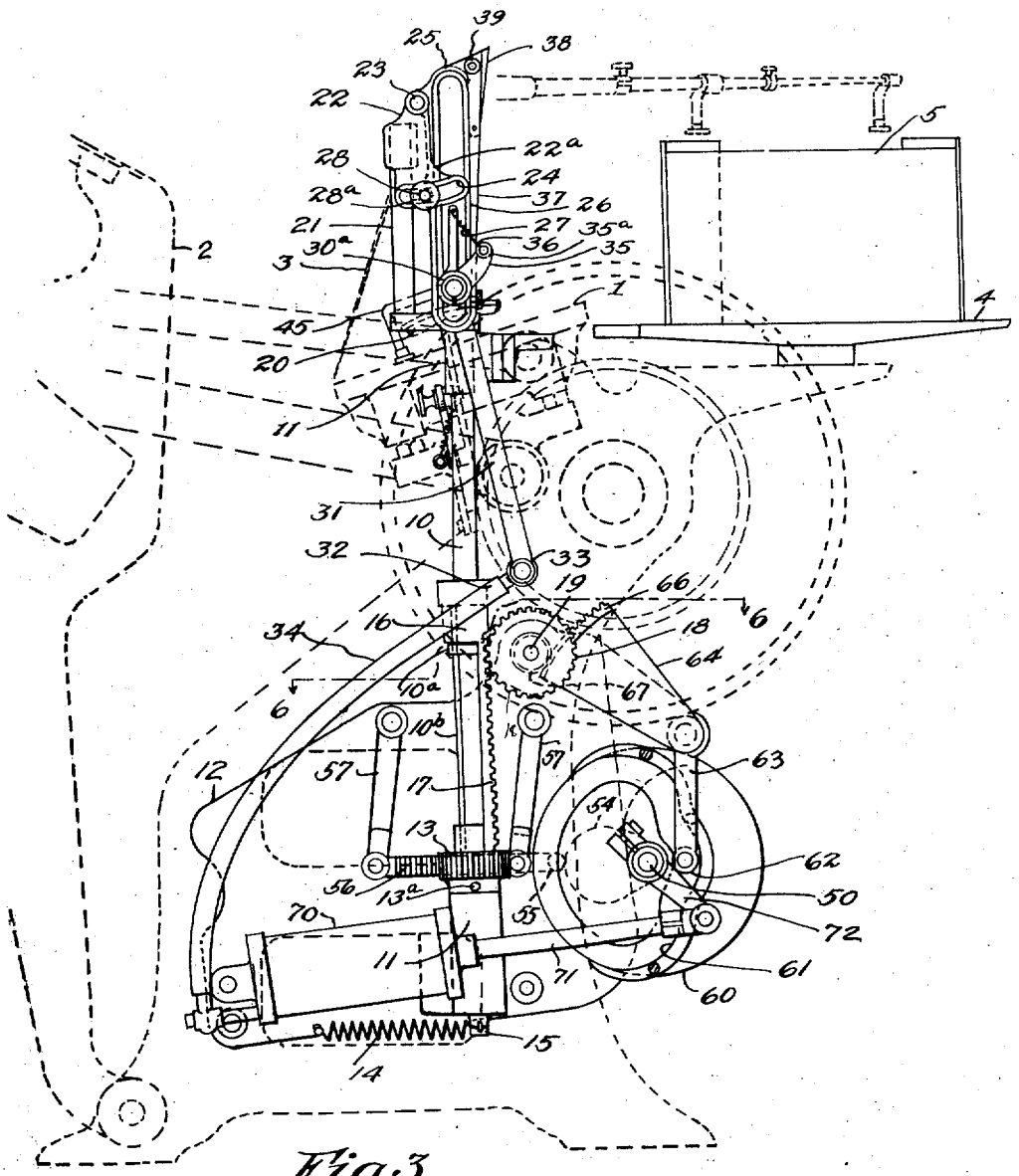
Figure 4:
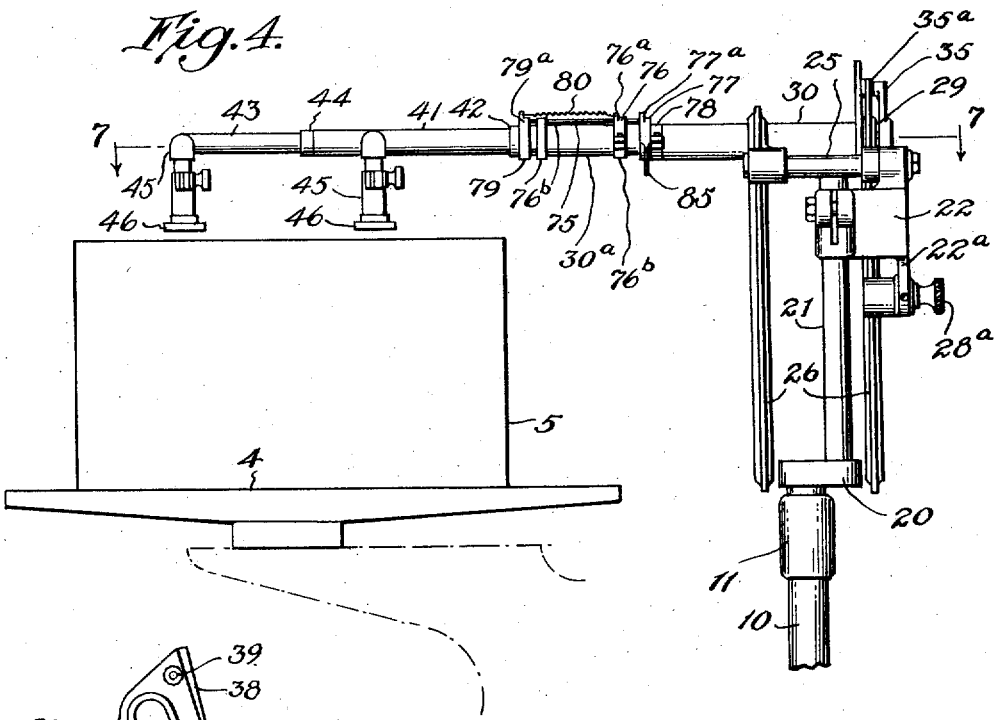
Figure 5:
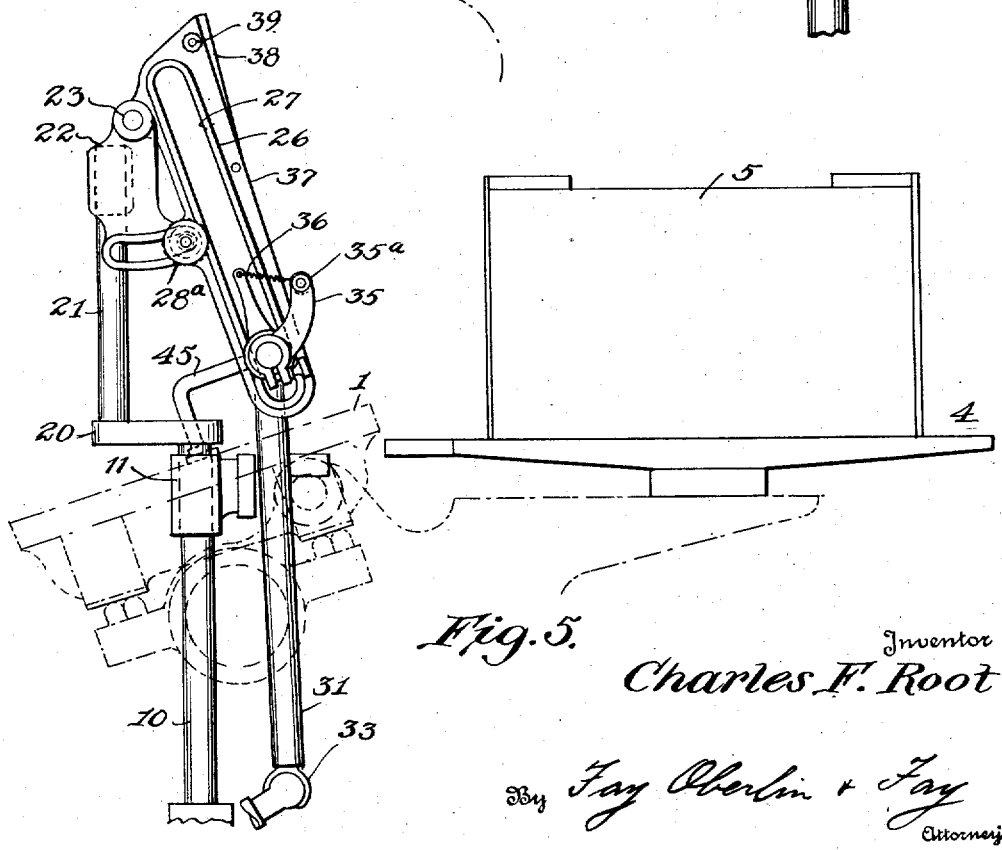

Fig. 1 is a plan view of my improved sheet transfer mechanism as attached to a press of the type in hand, the latter being shown in this, as well as in the succeeding figures, in dotted outline only; Fig. 2 is a front elevation of such mechanism and press; Fig. 3 is a side elevation of the same; Fig. 4 is a rear elevation of the upper portion of the mechanism as shown in Figs. 2 and 3, but with the parts in a different operative position; Fig. 5 is a side elevation of the upper portion of the mechanism, similar to that shown in Fig. 3, but with the parts in a different adjusted position; Fig. 6 is a transverse horizontal section of a detail with parts below appearing in plan, the plane of the section being indicated by the line 6—6, Figs. 2 and 3; Fig. 7 is a horizontal section and Fig. 8 is a transverse vertical section of another detail, taken at right angles to each other, as indicated by the line 7—7, Fig. 2, and line 8—8, Fig. 1, respectively, the parts in Fig. 7 appearing in the operative position shown in Fig. 4; Fig. 9 is a broken plan view on a larger scale of a portion of the mechanism, specifically the left hand end of the detail shown in Fig. 7; and Figs. 10, 11, 12 and 13 are transverse sections of such last-mentioned portion, the planes of such sections being indicated by the lines 10—10, 11—11, 12—12 and 13—13, respectively, Fig. 9.

The press illustrated in the drawings, as previously indicated, is of the familiar platen or Gordon type and need not be further described than to note the oscillatorily mounted platen 1, on which the sheet requires to be placed preliminarily to being brought into contact with the form by the conjoint movement of such platen and of the opposite bed 2, which carries such form in a suitable chase (not shown). In the several general views illustrated in the drawings, the press is shown with said platen in its sheet receiving position, the grippers 3, whereby the sheet is held onto the platen during the printing operation, being suitably raised.

For the purpose of illustration, I have chosen to show my improved mechanism as arranged for transferring successive sheets from a suitable table or support 4, which is adapted to hold a stack 5 of such sheets onto the platen 1 when in the open or sheet receiving position shown in the several figures, as just explained. It will be evident, however, that the principle of operation involved may just as well be applied to a reversal of this operation, i. e. to the transfer of successive sheets from such platen to a stack on the table or another table similarly mounted adjacent to the press. Such table is shown in more or less diagrammatic form, it being understood that it will be provided with suitable elevating mechanism, preferably automatic in character, whereby the upper surface of the stack 5 may be maintained at a substantially constant elevation. Various tables of this sort have been devised and are on the market and since the construction of such table forms no part of the present invention, detailed illustration thereof has been omitted as merely tending to confusion. This table, however, it will be noted, is located wholly to the rear and at one side of the platen so as not to interfere in any way with access to the latter or to other parts of the press.

The main supporting member of the sheet feeding or transferring device consists of a vertical rod or shaft 10, preferably tubular, that is oscillatorily supported in suitable bearings 11 attached to the one side frame of the press, e. g. the left-hand side, as shown in the drawings. The upper of these bearings may be attached directly to such side frame, while the lower, along with the various operative parts associated with such shaft, is carried by a supplemental frame or plate 12 that is adapted to be bolted against the lower portion of such side frame. A spur pinion 13, that is secured to shaft 10 by pin 13*a* immediately above the lowermost bearing 11, serves at the same time as a collar whereby such shaft is supported on such bearing, while a tension spring 14 connected at one end with a radial projection 15 on the lower extremity of such shaft which projects through said bearing 11, and at its outer end to the plate 12, tends normally to rotate said shaft in a clockwise direction when regarded in plan (see Fig. 1).

Reciprocably mounted on the shaft 10 between bearings 11, or rather between the uppermost of said bearings and said pinion 13, is a sleeve 16, the major portion of which is formed with circular, or rather, arcuate, transverse teeth that constitute a circular rack 17 (see Fig. 6). Just as shaft 10 constitutes the main supporting member for the sheet transferring member, so this sleeve may be regarded as a secondary support therefor; indeed, as will be presently explained, it is to the sleeve that the device in question is the more directly connected. A pinion 18, mounted on a stud 19 that projects laterally from plate 12, meshes with such rack 17 and is adapted upon being rotated to raise and lower sleeve 16, such raising and lowering being accomplished positively, as will be presently described, gravity assisting in returning the sleeve to its lowermost position. Due to the circular form of rack 17, such raising and lowering of the sleeve may be carried out independently of or simultaneously with rotative movement of the sleeve as produced by rotation of pinion 13, it being understood that the sleeve is slidably keyed to the shaft 10 (see Fig. 6) through the medium of bracket 10*a* secured to said shaft and key 10*b* slidable in an aperture in said bracket, said key being secured to the sleeve, so that the former partakes of any rotative movement of the latter.

An arm 20 is fixedly attached to the upper end of shaft 10 just above the uppermost bearing 11 in which such shaft is held and serves to support in offset relation to said shaft a standard 21, said arm, and thus said standard, lying to the rear of the axis of the shaft in the position of parts shown in Figs. 1, 2 and 3, this corresponding with the normal position of said shaft heretofore referred to. However, upon oscillation of the shaft in a clockwise direction against spring 14, said arm and thus the standard 21 will be moved in a corresponding arcuate path about the axis of the shaft.

Surmounting standard 21 and fixedly secured thereto is a cap piece or bracket 22 that carries a transversely disposed shaft 23 and includes a depending portion 22[a] in which is formed an arcuate slot 24 that has such shaft as an axis. Oscillatorily mounted on shaft 23 is a frame 25 that preferably comprises, as shown (see Figs. 1, 2 and 7), two similar parallel guide members 26 that are spaced apart lengthwise of such shaft, the guide element in each member consisting of an elongated rectilinear slot 27, the upper end of which lies closely adjacent shaft 23, while the lower end extends downwardly to a point adjacent the arm 20. A threaded stud 28 on one member 26 projects through the arcuate slot 24 in cap piece 22 and receives a clamp nut 28[a], by means of which such member, and thus the companion member or the frame 25 as a whole, may be secured in desired angular position within the limits of said slot about the axis defined by shaft 23.

Slidably held in one of the two guide members 26 is a bushing 29 and journaled in said bushing is a tubular arm 30, said arm being disposed transversely of and projecting through both of said guide members and having a tubular extension 30[a] that consists of a second tubular member of smaller diameter rotatably fitted within said arm 30, as best shown in Fig. 7. Attached to arm 30, preferably at a point between said guide members, is the upper end of a tubular link 31, the lower end of which is pivotally attached to an arm 32 that projects forwardly from the upper end of sleeve 16. Reciprocation of said sleeve produced in the manner hereinbefore set forth accordingly serves to reciprocate said tubular arm 30 with its extension 30ª and parts carried thereby in a plane defined by the guideways 27 in frame 25. Link 31 is hollow, as indicated, and at its lower end, preferably concentric with the point of its pivotal attachment to arm 32, it is provided with a hose connection 33, a hose 34, (see Figs. 1 and 2) leading therefrom to a suitable suction pump or equivalent mechanism whereby a vacuum may be created in link 31 and member 30ª when desired, it being noted that, as shown in Fig. 7, suitable ports in the upper end of said link and in said tubular arm and member afford free communication between the two at all times.

A rocker 35, fixed to the outer end of tubular member 30ª, is provided with a roller 35ª that travels on an inclined rib 37 integral with the adjacent guide member 26 as said member, together with tubular arm 30, in which it is carried, is reciprocated lengthwise of the slot 27 in said guide member. A tension spring 36 is provided to assist in retaining such roller at all times in contact with said rib, so that the latter forms in effect a cam which will impart a slight oscillatory movement to the tubular member 30ª incidentally to its aforesaid movement. A separate plate 38, adjustably secured by means of a set screw 39 to the upper portion of rib 37, constitutes in effect a portion of the latter, the angularity of which may be varied so as to increase the amount of oscillatory movement imparted to tubular member 30ª in the upper portion of its movement in the guideways 27.

A tubular extension 40, in effect continues with tubular member 30ª, receives a telescoping tube 41 that may be held therein in various longitudinal and angular positions about the common axis by means of a clamp ring 42; and a second tube 43 is similarly fitted within said tube 41 and held in adjusted longitudinal and angular position about such axis by means of a clamp ring 44. Said tubes 41 and 43 carry similar angular picker fingers 45, constituting the sheet engaging and moving devices, these being provided with suction tips 46 at their outer ends, and the system of tubes just described being closed to the atmosphere save for such suction tips. Accordingly, when the latter are brought into contact with a sheet of paper and a suitable suction is created within said tubes, as hereinbefore dscribed, such sheet will be picked up or held, as the case may be, by these suction tips.

For the purpose of imparting rotative or oscillatory movement to pinions 13 and 18, respectively, in order in the one case to oscillate shaft 10 and in the other to reciprocate the sleeve 16, any suitable means may be provided. The preferred means, as illustrated, consist of a transverse driving shaft 50 journaled in suitable bearings 51 on the main frame of the press, the right-hand end of said shaft, as viewed in Figs. 1 and 2, being connected by means of suitable gears 52 with the so-called large gear 53 of the press. Said shaft 50, it will thus be seen, is rotated in unison with the movement of the various parts of the press, including the platen 1 and bed 2.

At its opposite end, the left, as viewed in the figures just named, shaft 50 carries a disk cam 54 of the form clearly shown in Fig. 3, such cam contacting with a roller 55 on the adjacent or forward end of a rack 56 that engages with pinion 13, said rack being carried by two links 57 oscillatorily attached to the plate 12. Cam 54 is thus adapted to positively impart a counter-clockwise movement to the pinion 13, the spring 14 producing the return or clockwise movement, as already explained.

Shaft 50 also carries adjacent said cam 54 a second disc 60 that is provided with a cam groove 61 of the form likewise best shown in Fig. 3. Such groove engages a roller 62 on one arm 63 of a bell crank lever. The other arm 64 is formed with a segmental gear 66 that meshes with a pinion 67, fixed to or integral with pinion 18. Oscillation of the bell crank, thus composed of arms 63 and 64, as produced by cam groove 61, will accordingly serve to oscillate said pinion 18 and thereby raise and lower sleeve 16. Such raising and lowering of the sleeve will not be affected by its rotative position as varied by the action of the rack 56 on pinion 13 since the circular teeth 17 of rack will remain at all times in mesh with pinion 18.

As shown in Fig. 3, a pump for producing the necessary vacuum at stated intervals may be combined with the other operating mechanism just described. Such pump will conveniently take the form of a cylinder 70, oscillatorily attached at one end to plate 12 and suitably connected with the hose 34. The piston (not shown) in said cylinder is reciprocated by means of a rod 71 connected at its outer end with a crank 72 on shaft 50 so that said piston will be reciprocated in unison with the movements of the other parts. Crank 72 is furthermore adjustable about shaft 50 so that the timing of the pump's operation may be varied.

It is very important to provide means for registering at the end of the feeding stroke on the platen such sheet in order to secure proper position of the sheet. It will be understood that stops are provided on the platen to determine the rear or inner position of the sheet, the latter being brought against these stops by the swinging movement imparted to the picker fingers. A stop or stops are also provided against which the sheet is brought at the end by a lateral shifting movement.

As best shown in Figs. 7 and 9, the tube 40, to which tube 41 is adjustably clamped, is capable of telescoping movement within tube 30ª that forms an extension of the tubular arm 30. Such movement of tube 40 is limited to a longitudinal direction by means of a rod 75 that is slidably held in two longitudinally spaced guides 76 on said extension 30ª. The ends of the rod, it will be noted, extend beyond such guides, respectively, and one such end is fixedly secured to a collar 77 that is movably mounted on tubular extension 30ª between inner guide 76 and a collar 78 on such extension that forms a stop; while the other end of said rod is similarly fixedly secured to a collar 79 that is fixedly mounted on tubular member 40 beyond the outer guide 76. Each of the two guides 76 is provided with an apertured ear 76ª and the collars 77 and 79 are provided with similar apertured ears 77ª and 79ª, said ears being so disposed that a tension spring 80, having suitably formed ends, may be disposed either as shown in Fig. 9, with one such end attached to the ear 76ª of the inner guide and the other end attached to the ear 79ª on the outer collar 79, or vice versa, with such last mentioned end attached to ear 76ª of the outer guide and the first mentioned end attached to the ear 77ª on the inner collar. With the spring connected in the manner first described above, it will obviously pull the tubular member 40 inwardly, i. e. to the left as shown in Figs. 7 and 9, while when said spring is connected in the reverse manner, it will tend to push said tubular member 40 outwardly, i. e., move the same towards the right, the amount of longitudinal shifting movement thus permitted tubular member 40 being limited by the space between guides 76 and collar 78.

As shown in Figs. 11 and 12, both guides 76 are carried by split rings 76*b* that may be adjustably clamped to the tubular member 30ª. Movement of collar 77, and thus of tubular member 40, in opposition to spring 80, is derived from a rocker 81 that is supported about a transverse axis on a bracket 82 projecting from the side frame of the press adjacent the upper bearing 11 in which shaft 10 is journaled. The upper end of the rocker carries a curved plate 84 that is adapted, upon swinging movement of the rocker, to strike a segmental rib 85 that projects in a downward radial direction from collar 77. The rocker 81 is adjustably connected with the one end 86 of a two arm lever, the other end 87 of which extends downwardly below the axis of the rocker and is provided with a roller 88 disposed to engage with one side or the other of a cam 89 on the so-called small head 90 of the press. A tension spring 91 is connected with the rocker or the adjacent arm of the lever so as to hold the roller 88 in position to be struck by this cam.

Depending upon the manner in which spring 80 is connected up and upon whether plate 84 on rocker 81 engages with the right or left-hand side of the rib 85 on collar 77, said collar will be moved to the right from the position shown in Fig. 9, or to the left from the alternative position which said collar will normally occupy if the connections of the spring 80 be reversed. Such movement of the collar will correspondingly shift the tube 40, collar 79 on the latter being connected with collar 77 by rod 75, and as a result the picker fingers will likewise be shifted either to the right or to the left, carrying along therewith the sheet which has been picked up by said fingers. This shifting movement is timed to occur just as the suction is about to be released so that the sheet will be brought up against the lateral guides on the platen as such sheet is deposited thereon. Depending upon whether it is desired to align the sheet against stops on the right or left-hand side of the platen, provision will be made in the manner hereinbefore described for thus shifting the parts in question in one direction or the other.

Having thus described with sufficient detail the construction and mode of operation of the several component parts of my sheet feeding mechanism, the operation thereof as a whole may be briefly set forth. The vertical shaft 10 will be swung once for every revolution of shaft 50 through an arc of approximately 90 degrees first in one direction to carry the picker fingers from the position shown in dotted outline in Figs. 1, 2 and 3, where they lie over the stack 5, to the position shown in full lines in the same figures, where they lie in operative relation to the platen 1, and then back again from said last mentioned position to said first mentioned position. The movement just described, as previously explained, is positively produced in one direction through reciprocation of the rack that meshes with pinion 13 on said shaft and is controlled in the opposite direction by the same rack, the tension spring 14 being the impelling agent.

Coincidentally with the rotative movement thus imparted to shaft 10, the sleeve 16 is first raised, i. e., when the picker fingers are to be brought into position over the stack 5, and thereupon, during the horizontal swinging movement of the fingers due to the turning of the shaft 10 about its axis, said sleeve is lowered to lower the fingers in proper position over the platen; and finally, the movements just described are repeated in reverse order as the shaft swings the fingers back again into position over the stack, thereby campleting the cycle.

The movement of the sheet from the stack to the platen, it will be seen, is through an approximately arcuate path, the stack being so located with reference to the upper position of the picker fingers that these will be brought into contact with such sheet at points aligned with and closely adjacent to the front edge of the topmost sheet which is to be transferred. The path of movement in question is as a matter of fact the resultant of a compound vertically reciprocatory and horizontally oscillatory movement imparted to the sheet transferring device. The inclined or cam faced rib 37, by oscillating the tubular arm 30 that carries the picker fingers, serves to present the latter in proper position substantially parallel with the sheet on the stack in such upper position and similarly permits the picker fingers to incline into approximate parallelism with the platen in the lower position of such tubular arm and fingers. It will be understood, of course, that the suction producing means are operated or controlled so that a vacuum is created in the tubular arm and through it communicated to the suction tips when the latter are thus brought over the stack, such vacuum being maintained until the sheet is transferred into proper position on the platen, whereupon by breaking the vacuum, the sheet is allowed to remain behind when the sucker fingers start on their return movement. It will also be understood that the weight of the sucker fingers overbalances the rocker 35 which carries the roller that travels on said inclined rib 37, although if desired, means such as spring 36 may be added positively to insure such contact of the roller with the rib.

Angular adjustment of the picker fingers to bring the sucker tips when in their lower position into proper parallel relation with the platen is obtained by loosening the clamp screws 42 and 44, whereupon the fingers may be rotated about the axis of the tubular arm and secured in desired position. Similarly, by varying the angular position of the plate 38 at the upper end of rib 37, the fingers may be brought into proper parallel relation with the top of the stack 5.

The point or rather the transverse line, to which the forward edge of the sheet is brought and deposited on the platen, may be varied by adjusting the angular position of frame 25 with its parallel guide members about shaft 23, such adjustment, as will be obvious, being effective to shift the axis of oscillation of the sheet transferring device. The upper ends of the slots 27 in said guide members, it will be observed, lie closely adjacent to said shaft so that such variation in angular adjustment of the frame will not materially change the position of such upper slot ends, or in other words the position of the tubular member 20 when in elevated position. The latter will accordingly bring the picker fingers to substantially the same position when raised, irrespective of any such adjustment of the frame, such adjustment affecting only the position of the tubular member and thus of the picker fingers in their lower position. As shown in Fig. 5, the effect of swinging the frame forwardly, i. e. to the right from the position shown in Fig. 3, is correspondingly to move the lower platen-contacting position of the picker fingers to the forward or upper edge of the platen. Accordingly, it is possible without shifting the position of the stack 5 to vary the position of the sheet on the platen due to the differential movement imparted to the tubular member 20 by the inclination of the guide member 26, incidentally to the lowering of said tubular member while it is being swung from the stack to the platen.

The present mechanism has been described without reference to any mechanical device for automatically removing the sheet from the platen after it has been printed. It should be noted, however, that suitable timing of the valve controlling the suction and the proper location of the picker fingers, so as to engage the sheet at its forward edge as it lies on the platen and carries same during the return movement of the picker fingers, would constitute of the device herein disclosed a sheet delivery instead of a feed mechanism.

The incorporation of my improved sheet feeding mechanism in a Gordon or platen printing press of standard design, it will be obvious, requires no reconstruction of such press nor does such feed mechanism prevent access to the press in the accustomed manner since the vertical shaft that constitutes the main support of the sheet transferring device is disposed laterally adjacent to the platen and the stack is stationed adjacent to said support and beyond the same with reference to said platen. The various operative parts of the mechanism are extremely simple and may be made of sturdy design so as to withstand the hardest usage. At the same time all necessary adjustments for insuring the accurate location of the sheet where desired on the platen are provided for.

It is also desired again to emphasize the important advantage presented of securing the registration of the sheet on the platen as it is fed thereto. In other words, at the end of the feeding stroke, the sheet is brought into accurate register not only against the forward, but also the side gauge pins. It will be understood in connection with this phase of the operation of my improved mechanism that while the vacuum may resist separation of the sheet from the picker fingers, the sheet may nevertheless be permitted a relative sliding movement across the ends of the fingers, especially if the vacuum is being relieved at just this juncture. The control of the vacuum producing means thus to reduce and finally relieve the vacuum in unison with the movement of the picker fingers is readily effected by properly timing the operation of the pump, as need not be explained in detail.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In mechanism of the character described, the combination of a support oscillatory about an approximately vertical axis; a guide member on said support normally occupying a fixed position relatively thereto, said guide member being angularly adjustable relatively to the axis of said support; and a horizontally extending member movably mounted on said guide member and carrying a sheet engaging and moving device.

2. In mechanism of the character described, the combination of a support oscillatory about an approximately vertical axis; a guide member on said support, said guide member being angularly adjustable relatively to the axis of said support; and a horizontally extending member movably mounted on said guide member and carrying a sheet engaging and moving device, said horizontally extending member being oscillatory about an axis transverse of said guide member.

3. In mechanism of the character described, the combination of a support oscillatory about an approximately vertical axis; a guide member on said support; a horizontally extending member movably mounted on said guide member and carrying a sheet engaging and moving device, said horizontally extending member being oscillatory about an axis transverse of said guide member; and adjustable means adapted to oscillate said horizontally extending member incidentally to movement thereof on said guide member.

4. In mechanism of the character described, the combination of a support oscillatory about and approximately vertical axis; a guide member on said support; a horizontally extending member movably mounted on said guide member and carrying a sheet engaging and moving device, said horizontally extending member being oscillatory about an axis transverse of said guide member; and means adapted to oscillate said horizontally extending member incidentally to movement thereof on said guide member, said means including a cam disposed alongside said guide member, and a rocker on said horizontally extending member adapted to contact with said cam.

5. In mechanism of the character described, the combination of a support oscillatory about an approximately vertical axis; a guide member on said support; a horizontally extending member movably mounted on said guide member and carrying a sheet engaging and moving device, said horizontally extending member being oscillatory about an axis transverse of said guide member; and means adapted to oscillate said horizontally extending member incidentally to movement thereof on said guide member, said means including a cam disposed alongside said guide member, and a rocker on said horizontally extending member adapted to contact with said cam, one portion of said cam being adjustable relatively to the other portion thereof.

6. In mechanism of the character described, the combination of a support oscillatory about an approximately vertical axis; a guide member on said support; a horizontally extending member movably mounted on said guide member and carrying a sheet engaging and moving device, said horizontally extending member being oscillatory about an axis transverse of said guide member; and means adapted to oscillate said horizontally extending member incidentally to movement thereof on said guide member, said means including a cam disposed alongside said guide member, a rocker on said horizontally extending member adapted to contact with said cam, and a spring normally retaining said rocker thus in contact with said cam.

7. In mechanism of the character described, the combination of a vertical shaft oscillatory about its axis; a guide member attached to the upper end of said shaft so as to be angularly adjustable relatively to such shaft-axis; a horizontally extending member movably mounted on said guide member and carrying a sheet engaging and moving device; and means adapted respectively to oscillate said shaft and reciprocate said horizontally extending member in said guide member.

8. In mechanism of the character described, the combination of a vertical shaft oscillatory about its axis; a guide member attached to the upper end of said shaft so as to be angularly adjustable relatively to such shaft-axis; a horizontally extending member movably mounted on said guide member and carrying a sheet engaging and moving device; a sleeve reciprocable on said shaft; a link connecting said sleeve with said horizontally extending member; and means adapted respectively to reciprocate said sleeve and oscillate said shaft.

9. In mechanism of the character described, the combination of a vertical shaft oscillatory about its axis; a guide member attached to the upper end of said shaft so as to be angularly adjustable relatively to such shaft-axis; a horizontally extending member movably mounted on said guide member and carrying a sheet engaging and moving device; a sleeve reciprocable on said shaft; a link connecting said sleeve with said horizontally extending member; and means adapted respectively to reciprocate said sleeve and oscillate said shaft, said means including arcuate rack teeth on said sleeve, and a pinion meshing therewith, whereby reciprocation of said sleeve is unaffected by oscillation of said shaft.

10. In mechanism of the character described, the combination of a vertical shaft oscillatory about its axis; a guide member attached to the upper end of said shaft so as to be angularly adjustable relatively to such shaft-axis; a horizontally extending member movably mounted on said guide member and carrying a sheet engaging and moving device; a sleeve reciprocable on said shaft; a link connecting said sleeve with said horizontally extending member; and means adapted respectively to reciprocate said sleeve and oscillate said shaft, said means including a pinion fixed to said shaft, a reciprocable rack meshing with said pinion, arcuate rack teeth on said sleeve, and another pinion meshing therewith, whereby reciprocation of said sleeve is unaffected by oscillation of said shaft.

11. In mechanism of the character described, the combination of a support oscillatory about an approximately vertical axis; a guide member on said support; and a horizontally extending member movably mounted on said guide member and carrying a sheet engaging and moving device, such device being angularly adjustable about said carrying member.

12. In mechanism of the character described, the combination of a support oscillatory about an approximately vertical axis; a guide member on said support; and a horizontally extending member movably mounted on said guide member and carrying a sheet engaging and moving device, such device being both angularly adjustable about said carrying member and adjustable longitudinally of the same.

13. In mechanism of the character described, the combination of a support oscillatory about an approximately vertical axis; a guide member on said support; a horizontally extending member movably mounted on said guide member; and a plurality of sheet engaging and moving devices carried by said member, said devices being independently angularly adjustable about said carrying member.

14. In mechanism of the character described, the combination of a support oscillatory about an approximately vertical axis; a guide member on said support; a horizontally extending member movably mounted on said guide member; and a plurality of sheet engaging and moving devices carried by said member, said devices being both independently angularly adjustable about said carrying member and independently adjustable longitudinally of the same.

15. In mechanism of the character described, the combination of a support oscillatory about an approximately vertical axis; a guide member on said support; and a horizontally extending member movably mounted on said guide member and carrying a sheet engaging and moving device, said device being shiftable longitudinally of said carrying member.

16. In mechanism of the character described, the combination of a support oscillatory about an approximately vertical axis; a guide member on said support; a horizontally extending member movably mounted on said guide member and carrying a sheet engaging and moving device, said device being shiftable longitudinally of said carrying member; and means normally positioning said device thus longtiudinally of said carrying member.

17. In mechanism of the character described, the combination of a support oscillatory about an approximately vertical axis; a guide member on said support; a horizontally extending member movably mounted on said guide member and carrying a sheet engaging and moving device, said device being shiftable longitudinally of said carrying member; means normally positioning said device longitudinally of said carrying member; and other means adapted periodically to displace said device from such normal position.

18. In mechanism of the character described, the combination of a support oscillatory about an approximately vertical axis; a guide member on said support; a horizontally extending member movably mounted on said guide member and carrying a sheet engaging and moving device, said device being shiftable longitudinally of said carrying member; and means adjustable to normally position said device in either of two selected positions longitudinally of said carrying member.

19. In mechanism of the character described, the combination of a support oscillatory about an approximately vertical axis; a guide member on said support; a horizontally extending member movably mounted on said guide member and carrying a sheet engaging and moving device, said device being shiftable longitudinally of said carrying member; means adjustable to normally position said device in either of two selected positions longitudinally of said carrying member; and other means adapted alternatively periodically to displace said device from one or the other of such normal positions.

20. In mechanism of the character described, the combination of a vertical shaft oscillatory about its axis; a guide member attached to the upper end of said shaft so as to be angularly adjustable relatively to such shaft-axis; a horizontally extending tubular member movably mounted on said guide member; a sleeve reciprocable on said shaft; a tubular link connected at its one end with said tubular member and pivotally attached at its other end to said sleeve; suction producing means connected with said link; a second tubular member rotatably held within said first tubular member and having its interior connected therethrough with said tubular link; a suction finger carried by said second tubular member; and means controlling the rotative position of the latter within said first tubular member.

21. In mechanism of the character described, the combination of a vertical shaft oscillatory about its axis; a guide member attached to the upper end of said shaft so as to be angularly adjustable relatively to such shaft-axis; a horizontally extending tubular member movably mounted on said guide member; a sleeve reciprocable on said shaft; a tubular link connected at its one end with said tubular member and pivotally attached at its other end to said sleeve; suction producing means connected with said link; a second tubular member rotatably held within said first tubular member and having its interior connected therethrough with said tubular link; a suction finger carried by said second tubular member; and means controlling the rotative position of the latter within said first tubular member, said means including a rocker on said second tubular member and a cam disposed alongside said guide-member wherewith said rocker is adapted to contact.

22. In mechanism of the character described, the combination of a vertical shaft oscillatory about its axis; a guide member attached to the upper end of said shaft so as to be angularly adjustable relatively to such shaft-axis; a horizontally extending tubular member movably mounted on said guide member; a sleeve reciprocable on said shaft; a tubular link connected at its one end with said tubular member and pivotally attached at its other end to said sleeve; suction producing means connected with said link; a second tubular member rotatably held within said first tubular member and having its interior connected therethrough with said tubular link; a suction finger carried by said second tubular member; and means controlling the rotative position of the latter within said first tubular member, said means including a rocker on said second tubular member and a cam disposed alongside said guide-member wherewith said rocker is adapted to contact, one portion of said cam being adjustable relative to the other portion thereof.

23. In mechanism of the character described, the combination of a horizontally extending member carrying a sheet engaging and moving device; means supporting said member arranged and constructed to impart thereto a compound vertically reciprocatory and horizontally oscillatory movement; and means adapted to shift the axis of oscillation of said member incidentally to such reciprocation thereof.

24. In mechanism of the character described, the combination of a horizontally extending member carrying a sheet engaging and moving device; means supporting said member arranged and constructed to impart thereto a compound vertically reciprocatory and horizontally oscillatory movement; and adjustable means adapted variably to shift the axis of oscillation of said member incidentally to such reciprocation thereof.

25. In mechanism of the character described, the combination of a horizontally extending member carrying a sheet engaging and moving device; means supporting said member arranged and constructed to impart thereto a compound vertically reciprocatory and horizontally oscillatory movement; and an angularly adjustable guide member for said carrying member normally occupying a fixed position.

26. In mechanism of the character described, the combination of a horizontally extending member carrying a sheet engaging and moving device; means supporting said member arranged and constructed to impart thereto a compound vertically reciprocatory and horizontally oscillatory movement; and means adapted to shift the axis of oscillation of said member incidentally to such reciprocation thereof, said member being also oscillatory about its own axis.

27. In mechanism of the character described, the combination of a horizontally extending member carrying a sheet engaging and moving device; means supporting said member arranged and constructed to impart thereto a compound vertically reciprocatory and horizontally oscillatory movement; means adapted to shift the axis of oscillation of said member incidentally to such reciprocation thereof, said member being also oscillatory about its own axis; and other means adapted thus to oscillate said member incidentally to its reciprocatory movement.

28. In mechanism of the character described, the combination of a reciprocable horizontally extending member, said member being oscillatory about its own axis and carrying a sheet engaging and moving device, the latter being shiftable longitudinally of said member; and means adapted to shift the axis of oscillation of said member incidentally to the reciprocation thereof.

29. In mechanism of the character described, the combination of a reciprocable horizontally extending member, said member being oscillatory about its own axis and carrying a sheet engaging and moving device, the latter being shiftable longitudinally of said member; means normally positioning said device thus longitudinally of said member; and other means adapted to shift the axis of oscillation of said member incidentally to the reciprocation thereof.

30. In mechanism of the character described, the combination of a reciprocable horizontally extending member, said member being oscillatory about its own axis and carrying a sheet engaging and moving device, the latter being shiftable longitudinally of said member; means normally positioning said device thus longitudinally of said member; other means adapted periodically to displace said device from such normal position; and still other means adapted to shift the axis of oscillation of said member incidentally to the reciprocation thereof.

31. In mechanism of the character described, the combination of a support oscillatory about and reciprocable longitudinally of an approximately vertical axis; an adjustable guide member normally occupying a fixed position relatively to said support; a horizontally extending member movably attached to said guide member and carrying a sheet engaging and moving device; and connections between said support and said carrying member, whereby oscillatory and reciprocatory movement of the former is imparted to the latter.

32. In mechanism of the character described, the combination of a support oscillatory about and reciprocable longitudinally of an approximately vertical axis; a guide member angularly adjustable in an approximately vertical plane and normally occupying a fixed position relatively to said support; a horizontally extending member movably attached to said guide member and carrying a sheet engaging and moving device; and connections between said support and said carrying member, whereby oscillatory and reciprocatory movement of the former is imparted to the latter.

33. In mechanism of the character described, the combination of a support oscillatory about and reciprocable longitudinally of an approximately vertical axis; an adjustable guide member normally occupying a fixed position relatively to said support; a horizontally extending member movably attached to said guide member and carrying a sheet engaging and moving device; and connections between said support and said carrying member, whereby oscillatory and reciprocatory movement of the former is imparted to the latter, the latter being also oscillatory about its own axis.

34. In mechanism of the character described, the combination of a support oscillatory about and reciprocable longitudinally of an approximately vertical axis; a guide member angularly adjustable in an approximately vertical plane and normally occupying a fixed position relatively to said support; a horizontally extending member movably attached to said guide member and carrying a sheet engaging and moving device; and connections between said support and said carrying member, whereby oscillatory and reciprocatory movement of the former is imparted to the latter, the latter being also oscillatory about its own axis.

35. In mechanism of the character described, the combination of a support oscillatory about and reciprocable longitudinally of an approximately vertical axis; an adjustable guide member normally occupying a fixed position relatively to said support; a horizontally extending member movably attached to said guide member and carrying a sheet engaging and moving device; connections between said support and said carrying member, whereby oscillatory and reciprocatory movement of the former is imparted to the latter, the latter being also oscillatory about its own axis; and means adapted thus to oscillate said carrying member incidentally to its reciprocatory movement.

36. In mechanism of the character described, the combination of a support oscillatory about and reciprocable longitudinally of an approximately vertical axis; a guide member angularly adjustable in an approximately vertical plane and normally occupying a fixed position relatively to said support; a horizontally extending member movably attached to said guide member and carrying a sheet engaging and moving device; connections between said support and said carrying member, whereby oscillatory and reciprocatory movement of the former is imparted to the latter, the latter being also oscillatory about its own axis; and means adapted thus to oscillate said carrying member incidentally to its reciprocatory movement.

37. In mechanism of the character described, the combination of a support oscillatory about and reciprocable longitudinally of an approximately vertical axis; a guide member normally occupying a fixed position relatively to said support; a horizontally extending member movably attached to said guide member and carrying a sheet engaging and moving device, said device being shiftable longitudinally of said carrying member; and connections between said support and said carrying member, whereby oscillatory and reciprocatory movement of the former is imparted to the latter.

38. In mechanism of the character described, the combination of a support oscillatory about and reciprocable longitudinally of an approximately vertical axis; a guide member normally occupying a fixed position relatively to said support; a horizontally extending member movably attached to said guide member and carrying a sheet engaging and moving device, said device being shiftable longitudinally of said carrying member; means normally positioning said device longitudinally of said carrying member; and connections between said support and said carrying member, whereby oscillatory and reciprocatory movement of the former is imparted to the latter.

39. In mechanism of the character described, the combination of a support oscillatory about and reciprocable longitudinally of an approximately vertical axis; a guide member normally occupying a fixed position relatively to said support; a horizontally extending member movably attached to said guide member and carrying a sheet engaging and moving device, said device being shiftable longitudinally of said carrying member; means normally positioning said device longitudinally of said carrying member; other means adapted periodically to displace said device from such normal position; and connections between said support and said carrying member, whereby oscillatory and reciprocatory movement of the former is imparted to the latter.

40. In mechanism of the character described, the combination of a support oscillatory about and reciprocable longitudinally of an approximately vertical axis; a guide member normally occupying a fixed position relatively to said support; a horizontally extending member movably attached to said guide member and carrying a sheet engaging and moving device, said device being shiftable longitudinally of said carrying member; means normally positioning said device longitudinally of said carrying member; other means adapted periodically to displace said device from such normal position; and connections between said support and said carrying member, whereby oscillatory and reciprocatory movement of the former is imparted to the latter, the latter being also oscillatory about its own axis.

41. In mechanism of the character described, the combination of a support oscillatory about and reciprocable longitudinally of an approximately vertical axis; a guide member normally occupying a fixed position relatively to said support; a horizontally extending member movably attached to said guide member and carrying a sheet engaging and moving device, said device being shiftable longitudinally of said carrying member; means normally positioning said device longitudinally of said carrying member; other means adapted periodically to displace said device from such normal position; connections between said support and said carrying member, whereby oscillatory and reciprocatory movement of the former is imparted to the latter, the latter being also oscillatory about its own axis; and means adapted thus to oscillate said carrying member incidentally to its reciprocatory movement.

42. In a printing press, in combination, a platen device, a table disposed mainly at one side of the press, a sheet-transferring arm, means for effecting a movement of said arm between said table and said platen device, said movement including rocking about a substantially vertical axis located at one side of the press substantially vertical reciprocation and oscillation about the axis of the arm, and means for adjusting the position reached by said arm with respect to said platen device.

Signed by me, this 26th day of February, 1927.

CHARLES F. ROOT.